| United States Patent [19] | [11] Patent Number: 4,985,278 |
| George | [45] Date of Patent: Jan. 15, 1991 |

[54] COATING PROCESS

[75] Inventor: Eric R. George, Houston, Tex.

[73] Assignee: Shell Oil Company, Houston, Tex.

[21] Appl. No.: 380,960

[22] Filed: Jul. 17, 1989

[51] Int. Cl.$^5$ ............................................... B05D 3/02
[52] U.S. Cl. ..................................... 427/195; 427/197;
427/203; 427/224; 427/228; 427/385.5;
427/407.1; 427/423
[58] Field of Search ............... 427/195, 197, 203, 224,
427/228, 385.5, 407.1, 423

[56] References Cited

U.S. PATENT DOCUMENTS 3,440,079  2/1965  Jensen ..................................... 117/22
3,723,165  3/1973  Longo et al. ................. 117/93.1 PF
4,604,306  8/1986  Browning ........................... 427/423
4,632,309  12/1986  Reimer ..................................... 239/8

Primary Examiner—Bernard Pianalto

[57] ABSTRACT

An improved process for the flame spray coating of an object with a polymeric material comprising a linear alternating polymer of carbon monoxide and at least one ethylenically unsaturated hydrocarbon, optionally blended with ethylene/$\alpha,\beta$-ethylenically unsaturated carboxylic acid copolymer, includes coating the object with a first coating of the polymeric material, thermally degrading at least the surface of the first coat, and subsequently supplying a second coating of the polymeric material.

7 Claims, No Drawings

COATING PROCESS

FIELD OF THE INVENTION

This invention relates to an improved process for coating an object with a linear alternating polymer of carbon monoxide and at least one ethylenically unsaturated hydrocarbon. More particularly, the invention relates to an improved flame spraying process or coating a solid object with a polymeric material comprising the linear alternating polymer or a blend of the linear alternating polymer with a polymer of ethylene and unsaturated carboxylic acid.

BACKGROUND OF THE INVENTION

The class of polymers of carbon monoxide and olefin(s) is well known in the art. Early methods for the production of various types of such polymers are illustrated by Brubaker, U.S. Pat. No. 2,495,286, U.K. No. 1,081,304 and Nozaki, U.S. Pat. No. 3,694,412. More recently the class of linear alternating polymers of carbon monoxide and at least one ethylenically unsaturated hydrocarbon, e.g., copolymers of carbon monoxide and ethylene or terpolymers of carbon monoxide, ethylene and propylene, has become of greater interest in part because of the greater availability of the polymers. These polymers, now becoming known as polyketones or polyketone polymers, have been shown to be of the repeating formula $-CO\text{-}(\text{-}A\text{-})\text{-}$ wherein A is a moiety of ethylenically unsaturated hydrocarbon polymerized through the ethylenic unsaturation. For example, in the case of a copolymer of carbon monoxide and ethylene, the polymer is represented by the repeating formula $-CO\text{-}(\text{-}CH_2-CH_2\text{-})\text{-}$. The more recent general processes for the production of such polymers are illustrated by a number of published European Patent Applications including 121,965, 181,014, 213,671 and 257,663. The process generally involves the use of a catalyst composition formed from a compound of a Group VIII metal selected from palladium, cobalt or nickel, the anion of a non-hydrohalogenic strong acid and a bidentate ligand of phosphorus, arsenic or antimony.

The polyketone polymers are relatively high molecular weight materials having established utility as premium thermoplastics. They are processed by methods conventional for thermoplastics into a variety of shaped articles which, among other uses, are employed as containers for food and drink. The polymers are also used to coat solid objects by spraying processes.

It is, on occasion, useful to blend the polyketone polymers with other polymeric materials in order to retain the more desirable properties of the polyketone while improving other properties. For example, polyketone polymer is blended with a polymer of ethylene and an unsaturated carboxylic acid to produce blends having an improved melt stability. Such blends are disclosed in copending U.S. patent application Ser. No. 203,960 filed June 8, 1988. In copending U.S. patent application Ser. No. 185,577, filed Apr. 25, 1988, the use of polyketone polymers or blends thereof with ethylene/unsaturated carboxylic acid copolymer in a flame spraying process is described and claimed. It would be of advantage, however, to provide an improved flame spraying process for the coating of objects with polyketone polymers or blends thereof.

SUMMARY OF THE INVENTION

The present invention provides an improved process for the coating of solid objects with linear alternating polymer of carbon monoxide and at least one ethylenically unsaturated hydrocarbon. More particularly, the invention relates to an improved flame spray process wherein the object to be coated is flame sprayed with a first layer of polymeric material comprising the linear alternating polymer optionally blended with an ethylene/unsaturated carboxylic acid copolymer, the object is heated to an elevated temperature sufficient to char or otherwise partially thermally degrade at least the surface of the first coating, and then flame spray coated with a second layer of the polymeric material. The invention further relates to the coated solid objects thereby produced.

DESCRIPTION OF THE INVENTION

The polymeric material employed in the improved flame spraying process of the invention is a linear alternating polymer of carbon monoxide and at least one ethylenically unsaturated hydrocarbon, optionally blended with polymer of ethylene and $\alpha,\beta$-ethylenically unsaturated carboxylic acid. The ethylenically unsaturated hydrocarbons which are useful as the precursor of the linear alternating polymers have up to 20 carbon atoms inclusive, preferably up to 10 carbon atoms inclusive, and are aliphatic such as ethylene and other $\alpha$-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter type of ethylenically unsaturated hydrocarbon are styrene, p-methylstyrene, p-ethylstyrene and m-isopropylstyrene. The preferred polyketone polymers for use in the flame spraying process of the invention are copolymers of carbon monoxide and ethylene or terpolymers of carbon monoxide, ethylene and a second hydrocarbon of at least 3 carbon atoms, particularly an $\alpha$-olefin such as propylene.

The structure of the polyketone polymers is that of a linear alternating polymer of carbon monoxide and at least one ethylenically unsaturated hydrocarbon and the polymer contains substantially one molecule of carbon monoxide for each molecule of unsaturated hydrocarbon. When terpolymers of carbon monoxide, ethylene and a second hydrocarbon are employed in the process of the invention there will be at least about two units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polyketone polymers is therefore illustrated by the repeating formula $$-CO\text{-}(\text{-}CH_2-CH_2-CO\text{-})_y \quad \text{(I)}$$

wherein G is the moiety of second hydrocarbon of at least 3 carbon atoms polymerized through the ethylenic unsaturation. The $-(CH_2-CH_2)-$ units and an $-CO-(G)-$units are found randomly throughout the polymer chain and the ratio of y:x is no more than about 0.5. In the modification of the invention wherein copolymer of carbon monoxide and ethylene without the presence of a second hydrocarbon is employed, the copolymer is represented by the above formula wherein y is 0. When y is other than 0, i.e., terpolymers are employed, ratios of y:x from about 0.01 to about 0.1 are preferred. The end groups or 'caps' of the polymer chain will depend upon what materials were present during the production of the polymer and whether or not the polymer was purified. The precise nature of the end groups is of little apparent significance so far as the overall properties of the polymer are concerned so that the polymer is fairly represented by the above formula for the polymeric chain.

Of broad interest are the linear alternating polymers of number average molecular weight from about 1000 to about 200,000, particularly those polymers of number average molecular weight from about 20,000 to about 90,000, as determined by gel permeation chromatography. The properties of the polymer will depend in part upon the molecular weight, whether the polymer is a copolymer or a terpolymer and, in the case of terpolymers, the nature of and the proportion of the second hydrocarbon present. Typical melting points for such polymers are from about 175° C. to about 300° C. but polymers having a melting point from about 210°° C. to about 270° C. are preferred. Such polymers will have a limiting viscosity number (LVN), when measured in m-cresol at 60° C., of from about 0.4 dl/g to about 10 dl/g, although polymers of LVN from about 0.8 dl/g to about 4 dl/g are preferred.

A method of producing the polymers which is now becoming conventional is to contact the carbon monoxide and hydrocarbon(s) in the presence of a catalyst composition formed from a palladium compound, the anion of a non-hydrohalogenic acid having a pKa, measured in water at 18° C, of below about 6 and preferably below 2, and a bidentate ligand of phosphorus. The scope of the process is extensive but, without wishing to be limited, a preferred palladium compound is a palladium alkanoate such as palladium acetate, a preferred anion is the anion of trifluoroacetic acid or p-toluenesulfonic acid and the preferred bidentate phosphorus ligand is 1,3-bis(diphenylphosphino)propane or 1,3-bis[di(2-methoxyphenyl)phosphino]propane.

Polymerization is conducted by contacting the reactants in the presence of the catalyst composition and a liquid reaction diluent, under polymerization conditions. Suitable reaction diluents include lower alkanols and methanol is preferred. Typical polymerization conditions include a reaction temperature of from about 20° C. to about 150° C., but preferably from about 50° C. to about 135° C., and a reaction pressure sufficient to maintain the reaction mixture in the liquid phase. Such pressures are from about 1 atmosphere to about 200 atmospheres but more often are from about 10 atmospheres to about 100 atmospheres. Reactant/catalyst composition contact is maintained by conventional methods such as shaking or stirring and subsequent to reaction the polymerization is terminated as by cooling the reaction mixture and releasing the pressure. The polyketone polymer product is typically obtained as an insoluble material suspended in the reaction diluent and is recovered by wellknown procedures such as filtration and decantation. The polyketone is used as produced or is purified by contacting the polymer with a solvent or a complexing agent which is selective for the catalyst residues.

The improved flame spray process of the invention is usefully conducted by employing the polyketone polymer without the presence of other materials. However, conventional additives such as antioxidants and stabilizers which are designed to improve the properties of the coated object may be incorporated within the polyketone polymer. In a particular embodiment, the polyketone is blended with a second polymeric component and the resulting blend is employed in the flame coating process. A second polymeric component which is preferred as the co-component when a blend is employed is a polymer of ethylene and at least one $\alpha,\beta$-ethylenically unsaturated carboxylic acid. Although a variety of such unsaturated carboxylic acids of up to 10 carbon atoms inclusive, or in some cases even more, is useful as a monomer in the ethylene copolymers, e.g., Z-hexenoic acid, 2-octenoic acid and 2-decenoic acid, the preferred ethylenically unsaturated carboxylic acids are those of up to 4 carbon atoms inclusive which are acrylic acid, methacrylic acid and crotonic acid. Methacrylic acid and acrylic acid are particularly preferred components of the ethylene/unsaturated carboxylic acid copolymer. The polymer may contain more than one unsaturated acid monomer, but preferred polymers are copolymers of ethylene and a single unsaturated acid monomer.

The ethylene/unsaturated carboxylic acid copolymers are those having a relatively large proportion of ethylene and a relatively small proportion of $\alpha,\beta$-ethylenically unsaturated carboxylic acid. Suitable copolymers have from about 0.1% by weight to about 35% by weight of unsaturated carboxylic acid, based on total copolymer. Preferably, the copolymers have from about by weight to about 20% by weight of the unsaturated carboxylic acid, on the same basis.

The method by which the copolymers are prepared is not critical and ethylene/unsaturated carboxylic acid copolymers as produced by a variety of methods are satisfactory when polyketone blends are used in the flame spraying process. A number of ethylene/acrylic and copolymers and ethylene/methacrylic acid polymers are commercially available. A particularly useful class of ethylene/acrylic acid copolymers is marketed by Dow Chemical Company under the trademark PRIMACOR ® and a second preferred class of copolymers is marketed by DuPont under the trademark NUCREL ®. A general discussion of the production of ethylene/unsaturated carboxylic acid copolymers is found in Thompson et al, U.S. Pat. No. 3,520,861 and Armitage, U.S. Pat. No. 4,351,931, the disclosures of which are incorporated herein by reference.

As stated, the process of the invention Is usefully conducted with the polyketone polymer without the presence of ethylene/unsaturated acid. The preferred method of operating the improved flame spraying process of the invention, however, is in an alternate embodiment wherein the polymeric feed for the flame spraying process is a blend of polyketone polymer and the ethylene/unsaturated acid copolymer. When such a blend is employed, blends containing from about 0.1% by weight to about 35% by weight of ethylene/unsaturated carboxylic acid, based on total blend, are preferred and particularly preferred in this embodiment are blends containing from about 1% by weight to about 10% by weight, on the same basis, of the ethylene/carboxylic acid copolymer.

The method of forming a blend to be used in the process of the invention, when blends are employed, is not material as long as a uniform blend of the components is obtained without undue degradation of the components or the resulting blend. In one modification the polyketone Polymer and the ethylene/unsaturated carboxylic copolymer are mixed in a finely divided form and passed through an extruder to produce the blend as an extrudate. In an alternate modification the components are blended in a mixing device operating at high shear. The blend of the polyketone and the ethylene/unsaturated carboxylic acid is a non-miscible blend wherein the ethylene/unsaturated carboxylic acid copolymer exists as a discrete phase in the polyketone matrix with a particle size on the order of from about 0.2 micron to about 20.0 micron, preferably from about 0.5 micron to about 5 micron. The blend is, of course, not homogeneous but good results are obtained in the process of the invention when the blend is a uniform mixture of the dispersed ethylene/unsaturated carboxylic acid copolymer in the continuous polyketone polymer phase.

The blends which are employed in the process of the invention may contain other conventional additives such as antioxidants, stabilizers, pigments or dyes and other materials designed to improve the processing of the blend components or improve the properties of the resulting blend. Such additives are added by conventional methods prior to, together with or subsequent to the blending of the component polymers.

The general methods of flame spraying polymeric or other finely divided materials are well known in the art. The basic concept of flame spraying of thermoplastic polymeric materials involves an apparatus wherein the polymeric material, a fuel and oxygen-containing gas are introduced into a combustion chamber where the fuel and oxygen-containing gas mixture ignites, thereby producing heat which serves to substantially melt the thermoplastic polymeric material. The molten polymeric material is thereafter propelled from the combustion chamber by a source of propelling gas onto the surface of the object to be coated. An alternate modification of the process, also termed flame spraying although not directly involving a flame, employs the use of a heated wire or filament to melt the polymer to be sprayed. The use of a flame produced by combustion of a fuel gas in air is generally preferred.

Illustrative fuels are generally low molecular weight hydrocarbons which ignite easily and are normally gaseous at ambient conditions. Examples of such suitable fuels are propane, propylene, ethylene and acetylene. As the oxygen-containing gas employed to cause combustion of the fuel, a variety of mixtures of oxygen and other 25 non-combustible gases are usefully employed. Air is preferred. A variety of gaseous materials is useful as the propelling gas including nitrogen, argon and helium. Largely for convenience and economy the use of air as the propelling gas as well as the combustion gas is preferred. Examples of such flame spraying processes and apparatus therefor are known in the art. A particularly useful process and equipment for use in the process is described in Reimer, U.S. Pat. No. 4,632,309. Other related processes are described in U.S. Pat. No. 4,604,306, U.S. Pat. No. 3,723,165 and U.. 3,440,079.

In a representative flame spraying process as applied particularly to the polymeric materials used in the improved process of the invention, the polymeric material comprising the polyketone polymer, optionally blended with ethylene/unsaturated carboxylic acid, in a finely divided form, is mixed with fuel gas and air and passed to a combustion chamber where the fuel and oxygen of the air are ignited, thereby providing the energy required to substantially melt the polymeric material. The molten polymeric material is propelled from the combustion chamber and from the apparatus by the use of compressed air as a propelling carrier gas and is allowed to impact upon a solid object, the coating of which is desired. The target object, although often heated, is typically relatively cool and will cause the molten polymer to solidify and thereby provide the coating.

The state of division of the polymeric material powder as well as the viscosity of the polyketone polymer is of importance in obtaining the better coatings on the target object. The polymeric material to be flame sprayed should be of a size from about 20 mesh to about 200 mesh, preferably from about 70 mesh to about 100 mesh. For best results, the limiting viscosity number (LVN) of the polyketone polymer, measured at 60° C. in m-cresol, should be from about 0.5 dl/g to about 1.8 dl/g and preferably is below 1.2 dl/g.

The object to be coated is a solid object for which a tough, wear and corrosion resistant coating is desired and objects of metal, glass, ceramic, plastic or other material are coated by the process. Most frequently, the process is used to coat a metal object such as a pipe, storage tank or hot water heater.

A practical problem generally associated with flame spraying processes in general, and which is rather independent of the particular process or the particular polymer employed, is adhesion between the thermoplastic material being sprayed and the target object. This is particularly troublesome when the coating is somewhat porous. Attempts have been made to overcome this problem by various treatments of the surface of the object to be treated including sandblasting and solvent and chemical washes.

The improved process of the invention overcomes the adhesion problem by initially flame coating the object with a first coating of polyketone or polyketone blend, which first coating is a relatively thin coating on the order of from about 1 mil in thickness to about 10 mils in thickness, preferably from about Z mils to about 5 mils. The initially coated object is heated, either by exposure to a flame or other thermal methods or by electrical methods, to a temperature higher than that encountered during the typical flame spraying process and sufficient to char or otherwise partially thermally degrade at least the surface of the first coating. Such temperatures are from about 270° C. to about 500° C., preferably from about 300° C. to about 400° C. Without wishing to be bound by any particular theory, it appears that the char or thermal degradation product coating serves as an impervious primer which facilitates the subsequent coating of the object with a second coating of the polyketone polymer or blend of polyketone polymer and ethylene/unsaturated carboxylic acid. The second coating should be as thick or thicker than the first coating and second coat thicknesses from about 4 mils to about 30 mils are satisiactory with second coat thicknesses of from about 8 mils to about 20 mils being preferred.

The improved flame coat spraying process of the invention, wherein a first coat is provided to the object to be coated, the surface of the first coat is charred or otherwise at least partially thermally degraded, and a second coat is subsequently provided, results in coatings which are overall less porous and therefore better able to resist harsh conditions such as heat and high humidity. The process is particularly useful for coating both internal and external automotive parts such as drive shafts and suspension springs and for coating storage tanks and industrial pipe.

The invention is further illustrated by the following Illustrative Embodiments which should not be regarded as limiting.

ILLUSTRATIVE EMBODIMENT 1

A linear alternaLing terpolymer of carbon monoxide, ethylene and propylene 87/011] was produced in the presence of a catalyst composition formed from palladium acetate, the anion of trifluoroacetic acid and 1,3-bis[di(2-methoxyphenyl)phosphino]propane. The terpolymer had a melting point of 218° C. and a limiting viscosity number (LVN), measured in m-cresol at 60° C., of 1.14 dl/g.

Illustrative Embodiment II

A blend of 84.5% by weight of the terpolymer of Illustrative Embodiment I, 15% of NUCREL® 535, an ethylene/methacrylic acid copolymer supplied commercially by DuPont, and 0.5% of Schulman 7821, a commercial polyethylene black concentrate, was produced by compounding on a 30 mm corotating twin screw extruder.

Samples of this blend were employed to coat the surface of a metal object by various flame coating procedures, but similar to the method and using apparatus described in U.S. Pat. No. 4,632,309. In a first coating procedure, a single coating of the blend was applied to the object with a thickness of 15-30 mils. In a second coating procedure, the same technique was used except the surface of the object was heated to a more elevated temperature and the flame employed in the flame coating process was of a higher temperature. In a third coating procedure, the temperature of the object was sufficiently hot to degrade a first layer applied. The degradation was then followed by applying a second coat of the polymeric material.

The coated objects were then maintained in a pressure vessel operating at 180° F., 100% humidity and a somewhat elevated pressure. The only object which maintained a good surface coating was the object coated by the third coating procedure as determined by crosshatched adhesion tests and visual observation of corrosion.

What is claimed is:

1. A process for coating a solid object with a polymeric material, which process comprises flame spraying a polymeric material provided as a powder having a particulate size from about 20 mesh to about 200 mesh, the polymeric material comprising a linear alternating polymer of carbon monoxide and at least one ethylenically unsaturated hydrocarbon, which linear alternating polymer has a limiting viscosity number from about 0.5 dl/g to about 10 dl/g as measured in m-cresol at 60° C., optionally uniformly mixed with up to about 35% by weight based on the total of a copolymer of ethylene and an α,β-ethylenically unsaturated carboxylic acid, by heating the polymeric material powder to substantially melt the polymeric material and thereafter propelling the substantially molten polymeric material onto the surface of the solid object to provide a first coating, thermally degrading at least the surface of the first coating and subsequently propelling additional substantially molten polymeric material onto the object to provide a second coating.

2. The process of claim 1 wherein the linear alternating polymer is represented by the repeating formula $$-CO-CH_2-CH_2-CO-G_y$$

wherein G is the moiety of a second ethylenically unsaturated hydrocarbon of at least 3 carbon atoms polymerized through the ethylenic unsaturation, and the ratio of y:x is no more than about 0.5.

3. The process of claim 2 wherein the polymeric material is a blend of the linear alternating polymer and from about 0.1% by weight to about 10% by weight, based on total blend, of a copolymer of ethylene and from about 0.1% by weight to about 35% by weight based on total copolymer of an α,β-ethylenically unsaturated carboxylic acid of up to 4 carbon atoms inclusive.

4. The process of claim 3 wherein G is a moiety of propylene and the ratio of y:x is from about 0.01 to about 0.1.

5. The process of claim 4 wherein the unsaturated carboxylic acid is acrylic acid.

6. The process of claim 4 wherein the unsaturated carboxylic acid is methacrylic acid.

7. In the process of coating a solid object with a polymeric material by flame spraying a polymeric material comprising a linear alternating polymer of carbon monoxide and at least one ethylenically unsaturated hydrocarbon optionally blended with a copolymer of ethylene and an α,β-ethylenically unsaturated carboxylic acid, the improvement which comprises a flame spraying on the solid object a first coating, thermally degrading at least the surface of the first coating and subsequently flame spraying on the solid object a second coating.

* * * * *